Jan. 24, 1961  A. C. HENNING  2,968,969
STEERING WHEEL COMPENSATING MEANS
Filed Jan. 18, 1960  2 Sheets-Sheet 1
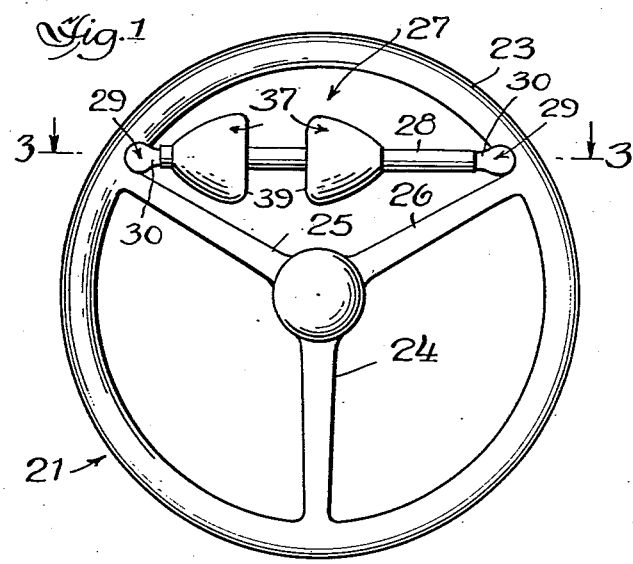
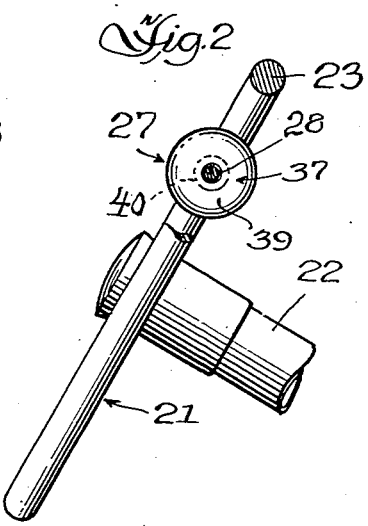
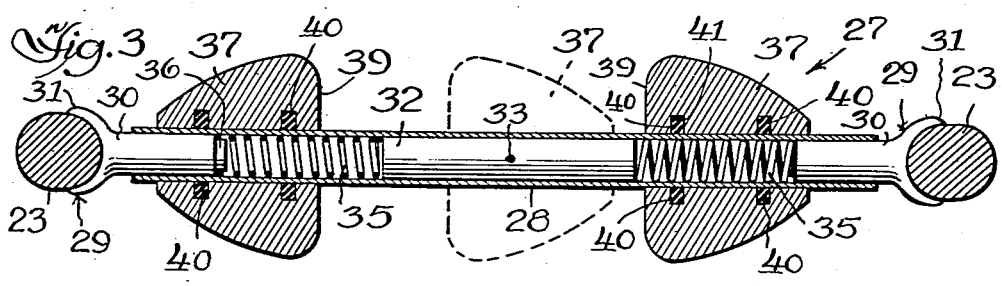
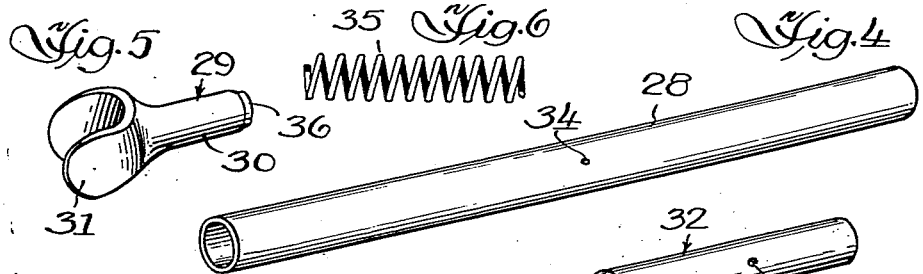
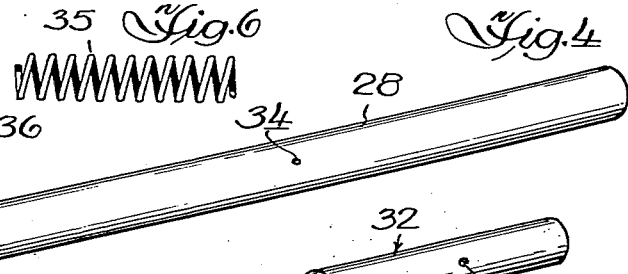
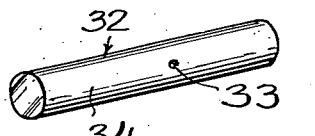
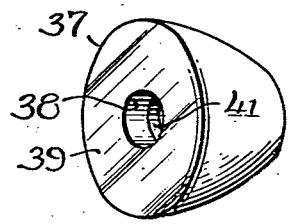
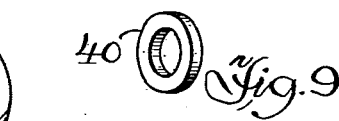
Inventor
Albert C. Henning,
By: Jones, Darbo & Robertson
Attys.

Jan. 24, 1961
A. C. HENNING
2,968,969
STEERING WHEEL COMPENSATING MEANS
Filed Jan. 18, 1960
2 Sheets-Sheet 2
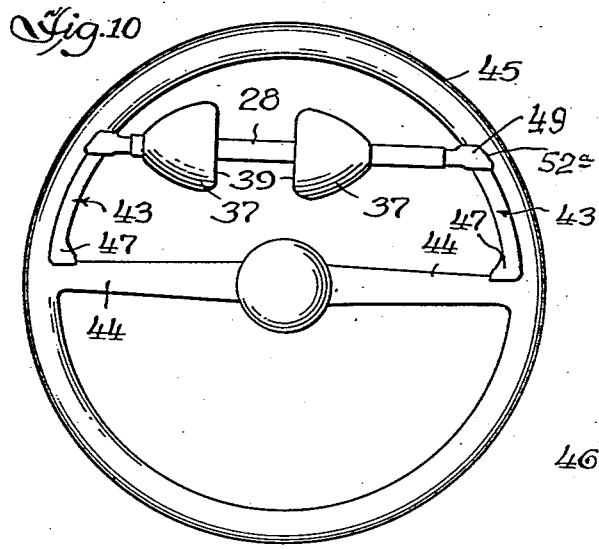
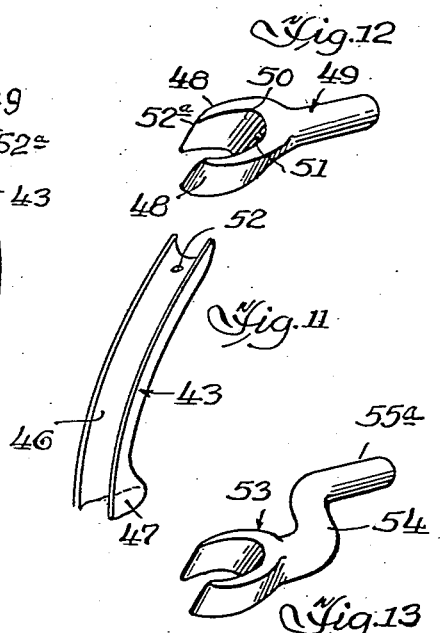
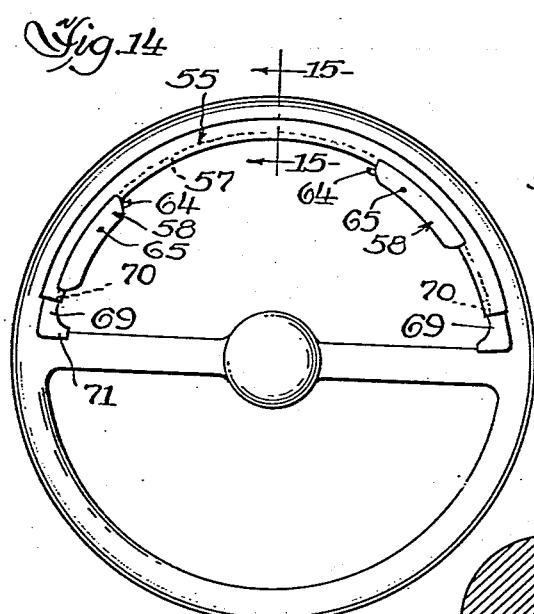
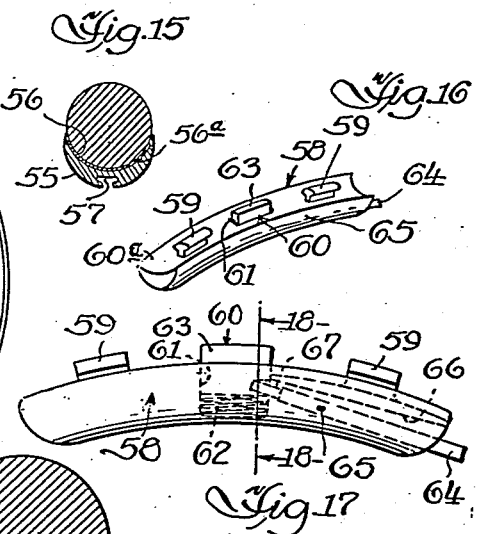
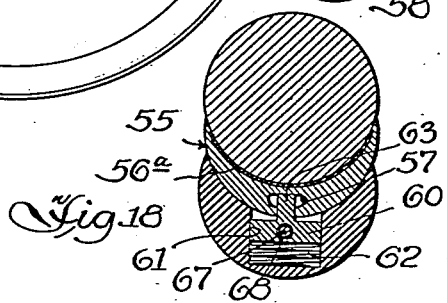
Inventor,
Albert C. Henning,
By: Jones, Darbo & Robertson, Attys.

United States Patent Office  
2,968,969  
Patented Jan. 24, 1961

2,968,969
STEERING WHEEL COMPENSATING MEANS
Albert C. Henning, 814 14th St. N.W., Minot, N. Dak.

Filed Jan. 18, 1960, Ser. No. 3,103

11 Claims. (Cl. 74—552)

This invention relates to steering wheel compensating means and is adapted for steering wheels that are set in a non-horizontal plane, or more particularly, at an angle, as in the usual passenger automobile and most trucks.

It is well known that when driving on a highly crowned road surface for example, with the car traveling one side of the road, there is a pull or torque on the steering wheel toward that side and this occurs also by wind pressure in that direction or other causes such as where there is low tire pressure or a sagging spring on that side of the car.

The means of the present invention embodies a device for compensating for the foregoing and other adventitious torque forces acting on the steering wheel. The device is of aid in minimizing driver fatigue and in lessening wear on the steering mechanism. It may be readily mounted on the standard steering wheel, interchangeability and adaptations for say two-spoke and three-spoke wheels being readily provided. The device permits ready compensation for a tendency of the vehicle to drift to one side of the road or the other, and thereby contributes to safety of operation of the vehicle while minimizing manual steering.

Broadly, the invention contemplates the combination with a vehicle steering wheel, of a localized mass eccentrically mounted on the wheel and selectively adjustable angularly of the wheel to counterbalance or create a torque to compensate for the outside influences referred to.

Other objects and advantages will be apparent from the following description, taken together with the accompanying drawings, showing illustrative embodiments thereof, and in which drawings—

Figure 1 is a top or plan view of a three-spoke steering wheel having an embodiment of the present invention associated therewith;

Figure 2 is a side view thereof, showing the slant or angle of the wheel and its post, the wheel being partly broken away for purposes of description;

Figure 3 is an enlarged cross section through the steering wheel of Fig. 1 and associated device, taken on the line 3—3 of Fig. 1, showing, however, the right-hand compensator in broken lines and an altered position thereof in full lines;

Figures 4 to 9 are perspective views on the scale of Fig. 3 of parts shown in the previous figures;

Figure 10 is a view somewhat similar to Fig. 1 but showing adaptation of the device to a two-spoke steering wheel;

Figures 11 and 12 are enlarged perspective views of parts shown in Fig. 10;

Figure 13 shows a modification of the part shown in Figure 12;

Figure 14 is a view somewhat similar to Figs. 1 and 10 but showing another embodiment of the invention and also adapted to a two-spoke steering wheel;

Figure 15 is an enlarged cross section taken on the line 15—15 of Fig. 14;

Figure 16 is a separate enlarged perspective view of one of the parts shown in Fig. 14;

Figure 17 is a further enlarged plan view of the part shown in Fig. 16; and

Figure 18 is a still further enlarged cross section taken on the line 18—18 of Fig. 17.

Referring in detail to the illustrative constructions shown in the drawings, and turning first to the embodiment of Figs. 1 to 9 inclusive, numeral 21 indicates the customary steering wheel of a passenger automobile, for example, mounted on an angle such as seen in Fig. 2 by the slanting steering column 22 and having the rim 23. The steering wheel 21 in this embodiment is shown with three spokes 24, 25 and 26, here spoke 24 being indicated aligned with the direction of movement of the vehicle and being located in the lower area of the wheel, while spokes 25 and 26 are in the upper area of the wheel and are uniformly oppositely diverged from the line of the spoke 24.

The device of the present invention is here represented generally by the numeral 27, and includes a track element in this instance in the form of a tube 28 of a length somewhat less than the distance between the ends of the wheel spokes 25 and 26. Tube 28 is mounted on the wheel rim within the sector of the rim defined by the last mentioned spokes. Mounting means for this purpose as shown includes a pair of plungers or end forks 29 that have shanks 30 entering opposite ends of the tube 28 respectively and bifurcate outer ends 31 that partially embrace the steering wheel rim 23. Within the tube 28 is a cylindrical filler plug 32 that may be staked therein by indentations 33 and 34, and at opposite ends of which are compression coil springs 35 in abutment with the plug and with shanks of the end forks respectively. Shank 30 of each end fork is shown reduced in diameter at its inner end as at 36 for the purpose of seating or chucking an end of a spring.

Adjustable as by sliding on the outer surface of the tube 28 is a weighted member or eccentric mass 37 that is desirably made of some dense material such as iron, lead, or the like, and which functions as a balance or compensator for the adventitious torque forces acting on the steering wheel. The compensator 37 has a bore 38 therethrough that has a smooth sliding fit on the tube 28. Preferably there may be two of the compensators 37 carried on the tube and, in this instance, each is formed of somewhat conoidal shape but with curved sides and corners so as to be smooth to the hand of the car driver. They have their bases 39 flat so that when the two elements are brought together with their flat bases 39 abutting, they form a jointly symmetrical element that is rounded to the hand. They are, however, independently movable on tube 28. The conoidal or pear shape of the weighted members 37 accommodates the curve of the wheel rim and minimizes interference thereat.

In order to provide releasable holding means for a selective given position of either of the compensators 37 longitudinally of the tube 28, they are shown each carrying internal annular resilient washers 40, in this instance, two for each compensator, that are snugly received in internal annular grooves 41 in the compensator before the latter is passed onto the tube 28. The washers 40 are preferably formed of an elastomer material such as natural or synthetic rubber or the like and are of an internal diameter slightly smaller than the bore 38 of the element 37 so as to yieldingly grip the outer surface of the tube 28 and provide holding rings for the compensator 37 thereon, while still permitting adjustment of the latter longitudinally of the tube when sufficient force is applied by the hand of the driver to overcome the resilient frictional drag of the washer on the tube. Initially, for instance, the elements 37 may be located at opposite ends of the tube 28, respectively, and then adjusted as the need arises, as next more specifically explained.

It will be seen that in the case of the three-spoke steering wheel, as just described, the track element, such as the tube 28, is located, by being placed between the ends of two of the spokes, toward the periphery or rim of the wheel, eccentrically of the wheel and, as here shown, in the upper segmental area of the latter. This places the mass of the weighted member or members 37 in a position to enhance a counterbalancing or compensating torque effect on the steering wheel. For example, moving over both of the weighted members 37 toward the left-hand end of the track tube 28, changes the angular position of the mass and weights the wheel for a tendency to rotate counterclockwise to counteract a tendency of the vehicle to drift to the right, in which drift the steering wheel would tend to turn clockwise, if such tendency is exerted by reason of any of the external causes for example previously mentioned. If the causes for this tendency to drift toward the right be eliminated, the driver may then move the weighted member or members 37 on the tube 28, to the center of the tube, i.e., to an angular position in alignment with the lower spoke 24, say, one member 37 on each side of said line, thus distributing the mass equally on each side. The presence of two weighted members 37 permits enhanced variations or what might be termed vernier adjustments of the weights for the purpose.

There may be times when adventitious torque forces would tend to rotate the steering wheel counterclockwise, or to the left, in which case the compensating members may be moved to the right-hand end of the tube 28. Even when the compensating weight is centered, or distributed equally on each side of the center line, for example, any road condition that tends to twist the steering wheel suddenly in either direction is met by the inertia of the counterbalancing or compensating mass, the latter thus acting as a stabilizing factor in the steering operations for the car.

It will be understood that the size or weight of the weighted member or members may be increased or decreased, if desired, while still permitting mounting on the tube 28 as illustrated and that the weights thereof may be varied to meet the needs of different types of vehicles, such as small cars, heavier cars, and trucks. As illustrated, the device may be sold as a unit and readily installed on any make of car without requiring the services of a mechanic for the purpose. Furthermore, it is readily interchangeable from one car to another, being removable merely by pressing the end forks 29 inwardly until released from the wheel rim.

Where a car has a steering wheel with only two spokes for example, as shown in Fig. 10, spacers or segmental rim shims 43 may be provided to locate the track tube 28 in parallel relation with the pair of aligned spokes 44 which substantially diametrically bisect the steering wheel having the rim here given the numeral 45. Spacers 43 abut the spokes and space the track tube 28 from the spokes so as to locate it at the same distance from the center of the wheel as in the case of Fig. 1.

Spacers 43 as best seen in Fig. 11 are of arcuate shape to correspond to the arc of the rim 45 and are peripherally troughed as at 46 to palm therein the inner periphery of the rim 45. At its lower end spacer 43 is bared as at 47 where it abuts the spoke 44, for seating purposes. At its other end spacer 43 is adapted to be received between the furcations 48 of the end fork 49 (shown in Fig. 12) that may be used in lieu of the end fork 29 shown in the earlier figures of the drawings. The end fork 49 has a somewhat deeper socket 50 between its furcations 48, in which is shown a tapped hole 51 that registers with a perforation 52 in the trough 46 of the spacer. A screw may be passed through the latter to thread into the tapped hole 51 to hold the spacer and end fork 49 together as a unit. The outer ends of the furcations 48 are tapered as at 52a to accommodate the curve of the steering wheel rim.

Where it may be desired to offset the track tube 28 below or above the steering wheel rim, an end fork 53 (Fig. 13) may be used having a shank bent as at 54 to have its inner end offset as at 55a to engage the tube.

Turning now to the embodiment of the invention shown in Figs. 14 to 18 inclusive, a track element is exemplified by a parti-cylindrical arcuate auxiliary rim piece 55, troughed as at 56 on its outer periphery to receive the steering wheel rim. To reinforce the auxiliary rim piece 55 and enhance its resilience, a spring steel liner 56a is shown embedded in the face of its trough 56. Along its other or inner periphery the auxiliary piece 55 has a dovetail groove 57 following the arc of the rim piece. One or more elongated weighted members such as 58 are here interengaged with the auxiliary rim piece to run on this as on a track. Here weighted member 58 is of arcuate shape corresponding to the arc of the track and has one or more and preferably two arcuately elongated dovetail tongues 59 on its curved face 60a that enter the arcuate dovetail slot 57 in the auxiliary rim piece. By reason of this dovetail interengagement the weighted member 58 may be interengaged with the track by the tongue and slot engagement at the end of the track and then may be slid around to the desired position thereon. Two such weighted members are preferred, as shown, which may be used as and for the purpose described with reference to the weighted members 37.

In this latter embodiment, means for releasably holding a weighted member 58 in selective positions on the track 55 is here illustrated by a dog 60 that drops into a cavity 61 in the weighted member against a compression coil spring 62. The dog 60 has a nose 63 that normally, under the influence of the spring 62, is pressed into the slot 57 of the track and provides a friction drag that holds the weighted member 58 in position thereon. To retract the nose 63 from the slot, to permit movement of the weighted member on the track, a lever 64 is shown pivoted at 65 in a passageway 66 in the weighted member. Passageway 66 communicates with cavity 61. Lever 64 at its inner end 67 engages the dog 60 by being received in recess 68 therein. By pressing the outer end of the lever 64 toward the track the nose 63 is retracted from the slot for the purpose explained, the spring 62 returning the nose to a braking or drag position when the lever is released.

At each end of the track 55 is shown end rests 69 that have lugs 70 that engage the dovetail slot 57 at its ends respectively. The other end of each rest may be shaped like the end 47 of the spacer 43, to engage the wheel rim and one of the spokes where the latter intersect the rim and seat thereagainst. Track 55, with weighted members 58 thereon, and end rests 69, may be sprung into the steering wheel upper segment as shown.

Weighted members found best heretofore have been of one pound weight each. The track elements and their end members may be made of plastic material coated or painted with lacquer to match any given color scheme. The compensators or weighted members may be similarly painted.

The rubber washers 40 may be of a common garden-hose variety obtainable in the usual hardware store. If the washer has an inside diameter of say five-eighths of an inch, the track tube on which it moves should have an outside diameter just slightly more than five-eighths inch to provide the desired friction. These washers can be easily replaced when required.

In either case, the compensators may be proportioned so as not objectionably to block the view of the instrument panel, and particularly with the form shown in Fig. 14 a clear view of the panel is permitted.

The invention is not intended to be limited to details of construction shown for purposes of exemplification and such changes may be made, including modifications or additions, as fall within the scope of the appended claims, without departing therefrom.

What is here claimed is:

1. Steering wheel compensating means to compensate for adventitious forces acting thereon, comprising, a track element attachable to a steering wheel, a weighted member slidably carried on said track element for movement thereon, and means for holding the weighted member in releasable selective positions on said track.

2. The structure of claim 1 wherein there are a pair of weighted elements movable on said track.

3. The structure of claim 1 including spacer shims attached to the track element at each end thereof respectively for adaptation to a two-spoke steering wheel.

4. Steering wheel compensating means to compensate for adventitious forces acting thereon, comprising, a track element in the form of a tube adapted to define a chord of an arc of the steering wheel, end forks entering said tube at opposite ends thereof respectively for engaging the wheel rim and spokes, springs within the tube pressing on said end forks, a weighted member slidable on said tube, an internal ring groove in said weighted member, and an elastomer friction ring in said groove providing a friction grip releasably inhibiting movement of the weighted member on the tube.

5. The structure of claim 4 wherein there is a filler plug in the tube providing an internal abutment for the springs.

6. The structure of claim 4 wherein there are a pair of weighted members slidable on the tube each of pear shape having their bases adjacent.

7. Steering wheel compensating means to compensate for adventitious forces acting thereon, comprising, an arcuate track attachable to the inside face of the steering wheel rim, said track having a peripheral inner slot therein of dovetail shape in cross-section, an arcuate-shaped weighted member mounted on said track for movement thereon, said member having a dovetail tongue riding in said slot, a spring pressed dog carried by said member and normally having a portion riding in said slot to provide a friction drag, a lever for retracting said dog to permit movement of the weighted member on the track, and means for attaching the track to the rim.

8. The structure of claim 7 wherein the track carries a member at each end for engagement with the wheel rim and a spoke thereof.

9. The structure of claim 7 wherein the track approximates a half circle both in perimeter and in cross section to accommodate the inside face of the wheel rim.

10. The structure of claim 9 including end forks carried by the track for engaging the rim and spokes of the wheel.

11. In combination with a non-horizontal automobile steering wheel, a localized mass, means mounting said mass eccentrically on said wheel, and means for selectively adjusting the angular position of the mass on said mounting means with respect to the wheel whereby to compensate for adventitious torque forces acting on the wheel.

No references cited.